C. O. W. THOMAS.
LAWN MOWER.
APPLICATION FILED JUNE 3, 1915.
1,148,203. Patented July 27, 1915.
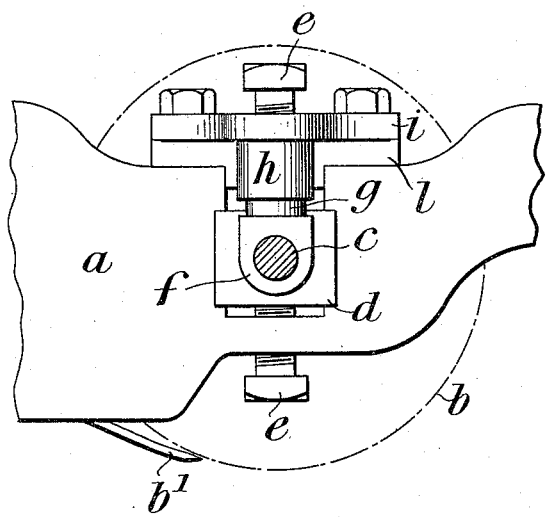
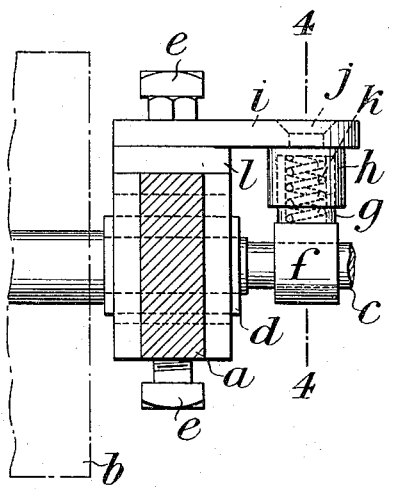
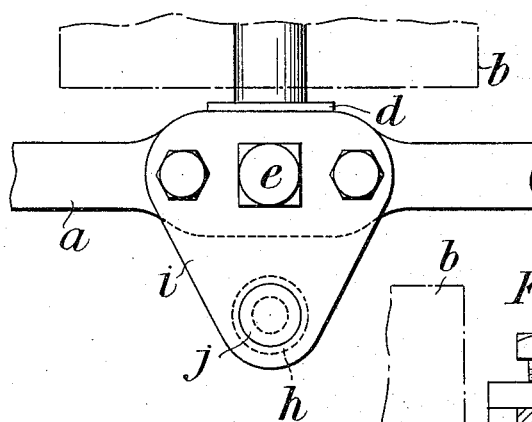
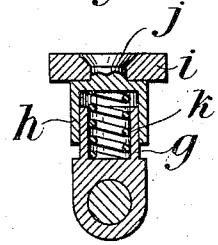
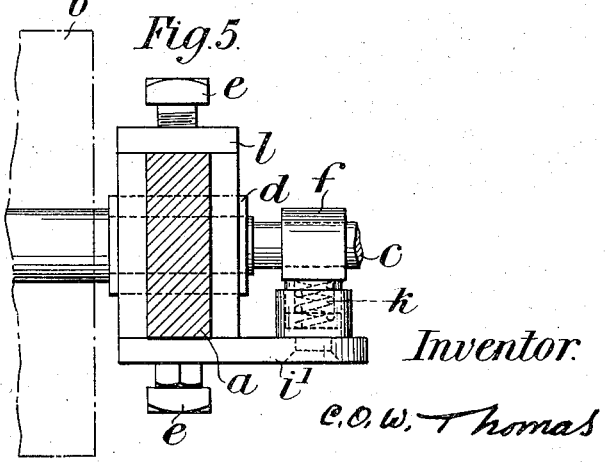
Inventor.
C. O. W. Thomas

UNITED STATES PATENT OFFICE.

CECIL OWEN WEBB THOMAS, OF LEWES, ENGLAND.

LAWN-MOWER.

1,148,203. Specification of Letters Patent. Patented July 27, 1915.

Application filed June 3, 1915. Serial No. 31,950.

*To all whom it may concern:*

Be it known that I, CECIL OWEN WEBB THOMAS, a subject of the King of Great Britain, residing at Southease Rectory, Lewes, Sussex, England, have invented new and useful Improvements in Lawn-Mowers, of which the following is a specification.

My invention relates to improvements in lawn-mowers and has for its object to provide improved means for controlling the position of the shaft of the rotary cutter with relation to the ledger-blade, whereby slight wear in the shaft of the cutter or in the bearings in which the shaft runs, will not affect the efficiency of the machine.

According to my invention, I employ in addition to the ordinary bearings supplementary bearings or sockets in which the shaft runs, and which are acted upon by springs which can be arranged either to press the rotary cutter toward the ledger-blade or to press the shaft of the cutter against the upper sides of the said ordinary bearings.

In the accompanying drawing, Figure 1 is an elevation of so much of a lawn-mower as is necessary to illustrate the arrangement of my invention when applied for pressing the rotary cutter against the ledger-blade. Fig. 2 is a plan view thereof. Fig. 3 is a sectional view at right angles to Fig. 1. Fig. 4 is a section on the line 4—4, Fig. 3, and Fig. 5 is a view similar to Fig. 3 but showing the arrangement wherein the invention is applied for pressing the rotary cutter shaft against the upper sides of the bearings.

$a$ indicates the frame at one side of the machine, $b$ the rotary cutter, $c$ the shaft of the said cutter and $d$ the bearing which is arranged in the frame in the usual manner, and which is adapted to be adjusted therein by means of set-screws $e, e$ for the purpose of adjusting the rotary cutter with relation to the ledger-blade $b^1$ in a well known manner.

$f$ is the supplementary bearing arranged in accordance with my invention, the said bearing being provided with a shank $g$ preferably made hollow as clearly shown in Fig. 4, and adapted to fit into and slide within a socket $h$ carried by a plate $i$ fitted on to the ordinary frame or bearing. As shown in Fig. 4, the socket $h$ is formed with a shank which is riveted into the plate $i$ as indicated at $j$.

$k$ is a spiral spring which is arranged within the tubular shank $g$ so that the supplementary bearing $f$ has a certain amount of spring movement. As shown in Figs. 1 to 4, the plate $i$ carrying the supplementary bearing, is fixed to the top side of the cap $l$ of the ordinary bearing $d$.

It is to be understood that the spring $k$ performs no function whatever in the permanent adjustment of the rotary cutter with relation to the ledger-blade, this being performed by means of the usual adjusting devices usually employed, which, in the arrangement shown in the drawing, are the set-screws $e, e$.

With the arrangement hereinbefore described it will be understood that, in case of any slackness in the main bearing $d$ of the rotary cutter shaft $c$ the supplementary spring bearing $f$ will, by acting upon the said shaft, retain the rotary cutter in proper relation to the ledger-blade $b^1$.

In the arrangement of my invention illustrated in Figs. 1 to 4 the bearing $f$ is applied to the frame $a$ above the main bearing $d$, but in the arrangement of my invention shown in Fig. 5, the plate $i^1$, which carries the supplementary bearing $f$, is shown, however, as applied to the frame $a$ beneath the main bearing $d$. The advantage of this latter arrangement is that, if the main bearing is worn and is adjusted to bring the rotary cutter into contact with the ledger-blade, the supplementary bearings will hold the rotary cutter shaft $c$ against the top of the main bearing $d$ and prevent the rotary cutter from tending to drop and thereby maintain one constant position of the said shaft within the said main bearing.

It will of course be understood that my improved device is arranged at each end of the shaft $c$.

Claims:

1. In a lawn mower, the combination with a frame of a ledger-blade carried thereby, a rotary cutter, a shaft upon which the cutter is mounted, bearings in which the said shaft rotates, means for adjusting the said bearings for regulating the position of the rotary cutter with relation to the ledger-blade, supplementary bearings through which the shaft runs, hollow shanks on the supplementary bearings, sockets carried by the sides of said frame in which the shanks slide and springs interposed between said shanks and said sockets for pressing the shanks away from the sockets, and permitting them to move toward said sockets against the tension of said springs.

2. In a lawn mower, the combination with a frame, of a ledger-blade carried thereby, a rotary cutter, a shaft upon which the cutter is mounted, bearings in which the said shaft rotates, means for adjusting the said bearings for regulating the position of the rotary cutter with relation to the ledger-blade, a plate extending horizontally from each side of said frame, vertically extending sockets provided on said plates, supplementary bearings through which the shaft runs, tubular shanks provided on said supplementary bearings in alinement with said sockets, and springs interposed between said shanks and said sockets for pressing the shanks away from the sockets and permitting them to move toward said sockets against the tension of said springs.

CECIL OWEN WEBB THOMAS.

Witnesses:
 JOHN E. BOUSFIELD,
 C. C. REDFIN.